(12) United States Patent
Ishiguro et al.

(10) Patent No.: US 8,635,688 B2
(45) Date of Patent: Jan. 21, 2014

(54) IMAGE PROCESSING APPARATUS, IMAGE PROCESSING METHOD, AND RECORDING MEDIUM

(75) Inventors: Kazuhiro Ishiguro, Toyohashi (JP);
Takayuki Nabeshima, Toyokawa (JP);
Hideyuki Toriyama, Toyokawa (JP);
Hiroyuki Suzuki, Toyokawa (JP);
Masaaki Saka, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1431 days.

(21) Appl. No.: 11/876,641

(22) Filed: Oct. 22, 2007

(65) Prior Publication Data

US 2008/0104685 A1    May 1, 2008

(30) Foreign Application Priority Data

Oct. 26, 2006   (JP) .................. 2006-291853

(51) Int. Cl.
*H04L 9/32* (2006.01)
*G06F 7/04* (2006.01)

(52) U.S. Cl.
USPC ............... 726/19; 726/16; 726/26; 726/27; 726/31; 358/1.14

(58) Field of Classification Search
USPC ......................................................... 726/19
See application file for complete search history.

(56) References Cited

U.S. PATENT DOCUMENTS 5,465,353 A * 11/1995 Hull et al. ........................ 1/1
5,475,205 A * 12/1995 Behm et al. .................. 235/375

(Continued)

FOREIGN PATENT DOCUMENTS

JP      07-114299      5/1995
JP      2001-078015    3/2001

(Continued)

OTHER PUBLICATIONS

Samsung Electronics, "Samsung Multifunction Printer's Practical Use Guide", 2011 Samsung Electronics Co., Ltd., entire document, http://www.samsung.com/us/pdf/PNT_Samsung_MFPs_PracticalUseGuide_v2.pdf.*

(Continued)

*Primary Examiner* — Edan Orgad
*Assistant Examiner* — Ronald Baum
(74) *Attorney, Agent, or Firm* — Buchanan Ingersoll & Rooney PC

(57) ABSTRACT

An image processing apparatus, comprising: an input portion that inputs image data of a plurality of pages of document; a password detector that detects a password given to each of the pages; a password judger that judges from a detecting result drew by the password detector about each of the pages, whether or not a shared password issued for each page in common is detected in addition to an individual password uniquely issued for each page; an entry requester that requests entry of a shared password if it is judged by the password detector that a shared password is detected, and requests entry of an individual password about each of the pages if it is judged by the password detector that a shared password is not detected; and an output permitting portion that permits image data of all the pages each having a shared password, which is the image data inputted by the input portion, if the appropriate shared password is entered in response to the request for entry of a shared password, and permits image data of a page having an individual password, if the appropriate individual password is entered about that page in response to the request for entry of an individual password.

21 Claims, 13 Drawing Sheets

(56) References Cited

U.S. PATENT DOCUMENTS

| | | | |
|---|---|---|---|
| 5,671,277 A * | 9/1997 | Ikenoue et al. | 713/179 |
| 5,873,735 A * | 2/1999 | Yamada et al. | 434/316 |
| 6,047,377 A * | 4/2000 | Gong | 726/21 |
| 6,236,996 B1 * | 5/2001 | Bapat et al. | 1/1 |
| 6,389,589 B1 * | 5/2002 | Mishra et al. | 717/170 |
| 6,438,574 B1 * | 8/2002 | Nagashima | 718/102 |
| 6,463,541 B2 * | 10/2002 | Hu | 726/27 |
| 6,964,013 B1 * | 11/2005 | Ono et al. | 715/207 |
| 7,266,215 B2 * | 9/2007 | Ikenoue et al. | 382/100 |
| 7,369,279 B2 * | 5/2008 | Van Oosterhout | 358/3.28 |
| 7,428,076 B2 * | 9/2008 | Bhattacharjya et al. | 358/3.28 |
| 7,506,365 B2 * | 3/2009 | Hirano et al. | 726/5 |
| 7,555,769 B1 * | 6/2009 | Shapiro et al. | 726/1 |
| 7,574,407 B2 * | 8/2009 | Carro et al. | 705/59 |
| 7,784,087 B2 * | 8/2010 | Yami et al. | 726/4 |
| 7,818,215 B2 * | 10/2010 | King et al. | 705/26.1 |
| 2002/0016921 A1 * | 2/2002 | Olsen et al. | 713/200 |
| 2002/0174010 A1 * | 11/2002 | Rice, III | 705/14 |
| 2004/0162807 A1 * | 8/2004 | Montagne | 707/1 |
| 2004/0179220 A1 | 9/2004 | Van Oosterhout | |
| 2004/0184065 A1 | 9/2004 | Guan et al. | |
| 2005/0022032 A1 * | 1/2005 | Zhao | 713/201 |
| 2005/0151992 A1 * | 7/2005 | Shaw et al. | 358/1.14 |
| 2006/0064741 A1 * | 3/2006 | Terao | 726/4 |
| 2006/0104515 A1 * | 5/2006 | King et al. | 382/190 |
| 2006/0143706 A1 * | 6/2006 | Kawasaki et al. | 726/19 |
| 2007/0204164 A1 * | 8/2007 | Cattrone et al. | 713/176 |

FOREIGN PATENT DOCUMENTS

| | | |
|---|---|---|
| JP | 2004-013378 | 1/2004 |
| JP | 2005-148393 | 6/2005 |
| JP | 2005-151149 | 6/2005 |

OTHER PUBLICATIONS

Notification of Reasons for Refusal in JP 2006-291853 dated Mar. 25, 2008, and English Translation thereof.

Office Action (Notification of the Third Office Action) dated Aug. 2, 2012, issued in corresponding Chinese Patent Application No. 200710180240.4. and an English Translation thereof. (23 pages).

* cited by examiner

IMAGE PROCESSING APPARATUS, IMAGE PROCESSING METHOD, AND RECORDING MEDIUM

This application claims priority under 35 U.S.C. §119 to Japanese Patent Application No. 2006-291853 filed on Oct. 26, 2006, the entire disclosure of which is incorporated herein by reference in its entirety.

BACKGROUND OF THE INVENTION

1. Field of the Invention

The present invention relates to an image processing apparatus that is applied to MFPs (Multi Function Peripherals), etc. capable of administrating output of confidential documents, etc., an image processing method, and a recording medium having an image processing program stored therein to make a computer of the image processing apparatus execute image processing.

2. Description of the Related Art

The following description sets forth the inventor's knowledge of related art and problems therein and should not be construed as an admission of knowledge in the prior art.

It is heretofore known by what is disclosed in Japanese Unexamined Laid-open Patent Publications No. 6-20027, No. 2005-151149 and No. 2005-148393, that when a confidential document is outputted for example, additional information is embedded in a ground pattern behind an image on the document, then an operation to copy the document is performed under control according to the embedded information, so that any third party could not copy the document without permission.

However, with this configuration to perform an operation to copy a document under control according to additional information embedded in the document as described above, even a right user such as an owner of the document may be prohibited from performing that operation, which still leaves very much inconveniences.

To cope with this issue, Japanese Unexamined Laid-open Patent Publication No. 2005-201069 discloses an art, wherein if a pattern given behind an image on a document is detected as the one indicating "output prohibit", a password is simply entered to cancel output prohibit.

However, this art disclosed in Japanese Unexamined Laid-open Patent Publication No. 2005-201069 is not perfect to administer security of documents, wherein even a user who is not the originator of the document can cancel output prohibit as long as he/she is the user authenticated to use the image processing apparatus, since a password stored in the image processing apparatus for user authentication is also used as a password for cancellation of output prohibit.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an objective of the present invention to provide an image processing apparatus that limits users who can output a document in order to ensure higher security, and lets a user such as a right user output a document by a simple operation in order to keep user conveniences when he/she intends to do it.

It is another objective of the present invention to provide an image processing method that limits users who can output a document in order to ensure higher security, and lets a user such as a right user output a document by a simple operation in order to keep user conveniences when he/she intends to do it.

It is yet another objective of the present invention to provide a recording medium having an image processing program stored therein to make a computer of the image processing apparatus execute processing by the image processing method.

According to a first aspect of the present invention, an image processing apparatus comprises:

an input portion that inputs image data of a plurality of pages of document;

a password detector that detects a password given to each of the pages;

a password judger that judges from a detecting result drew by the password detector about each of the pages, whether or not a shared password issued for each page in common is detected in addition to an individual password uniquely issued for each page;

an entry requester that requests entry of a shared password if it is judged by the password detector that a shared password is detected, and requests entry of an individual password about each of the pages if it is judged by the password detector that a shared password is not detected; and an output permitting portion that permits image data of all the pages each having a shared password, which is the image data inputted by the input portion, if the appropriate shared password is entered in response to the request for entry of a shared password, and permits image data of a page having an individual password, if the appropriate individual password is entered about that page in response to the request for entry of an individual password.

According to a second aspect of the present invention, an image processing apparatus comprises:

an input portion that inputs image data of a plurality of pages of document;

a password detector that detects an individual password uniquely issued for each page, which is given to each of the pages;

a password giving portion that gives to each sheet to be outputted, a shared password issued for each page in common, after the password detector detects an individual password given to each of the pages; and a display that displays the shared password.

According to a third aspect of the present invention, an image processing apparatus comprises:

an accepter that accepts entry of a shared password;

a generator that generates an individual password uniquely issued for each page based on the entered shared password, and the number of individual passwords generated herein is the same as that of image data to be outputted;

a display that displays the generated individual password; and a giving portion that gives the generated individual password and the shared password to each of the image data to be outputted.

According to a fourth aspect of the present invention, an image processing method comprises:

inputting image data of a plurality of pages of document;

detecting a password given to each of the pages;

judging from the password detecting result whether or not a shared password issued for each plurality of pages in common is detected in addition to an individual password uniquely issued for each page;

requesting for entry of a shared password if it is judged in the password judging step that a shared password is detected, and requesting for entry of an individual password about each of the pages if it is judged in the password judging step that a shared password is not detected; and permitting image data of all the pages each having a shared password, which is the image data inputted in the inputting step, to be outputted if the appropriate shared password is entered in response to the request for entry of a shared password, and permitting image data of a page having an individual password, to be outputted if the appropriate individual password is entered about that page in response to the request for entry of an individual password.

According to a fifth aspect of the present invention, an image processing method comprises:

inputting image data of a plurality of pages of document;

detecting an individual password uniquely issued for each page, which is given to each of the pages;

giving to each sheet to be outputted, a shared password issued for each plurality of pages in common, after detecting an individual password given to each of the pages; and displaying the shared password.

According to a sixth aspect of the present invention, an image processing method comprises:

accepting entry of a shared password;

generating an individual password uniquely issued for each page based on the entered shared password, and the number of individual passwords generated herein is the same as that of image data to be outputted;

displaying the generated individual password; and giving the generated individual password and the shared password to each of the image data to be outputted.

According to a seventh aspect of the present invention, a recording medium has an image processing program stored therein to make a computer of an image processing apparatus execute:

inputting image data of a plurality of pages of document;

detecting a password given to each of the pages;

judging from the password detecting result that a shared password issued for each plurality of pages in common is detected in addition to an individual password uniquely issued for each page;

requesting entry of a shared password if it is judged in the password judging step that a shared password is detected, and requesting entry of an individual password about each of the pages if it is judged in the password judging step that a shared password is not detected; and permitting the image data of all the pages each having a shared password, which is the image data inputted in the inputting step, if the appropriate shared password is entered in response to the request for entry of a shared password, and permitting image data of a page having an individual password, if the appropriate individual password is entered about that page in response to the request for entry of an individual password.

According to a eighth aspect of the present invention, a recording medium has an image processing program stored therein to make a computer of an image processing apparatus execute:

inputting image data of a plurality of pages of document;

detecting an individual password uniquely issued for each page, which is given to each of the pages;

giving to each sheet to be outputted, a shared password issued for each plurality of pages in common, after detecting an individual password given to each of the pages; and displaying the shared password.

According to a ninth aspect of the present invention, a recording medium has an image processing program stored therein to make a computer of an image processing apparatus execute:

accepting entry of a shared password;

generating an individual password uniquely issued for each page based on the entered shared password, and the number of individual passwords generated herein is the same as the number of image data to be outputted;

displaying the generated individual password; and giving the generated individual password and the shared password to each of the image data to be outputted.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
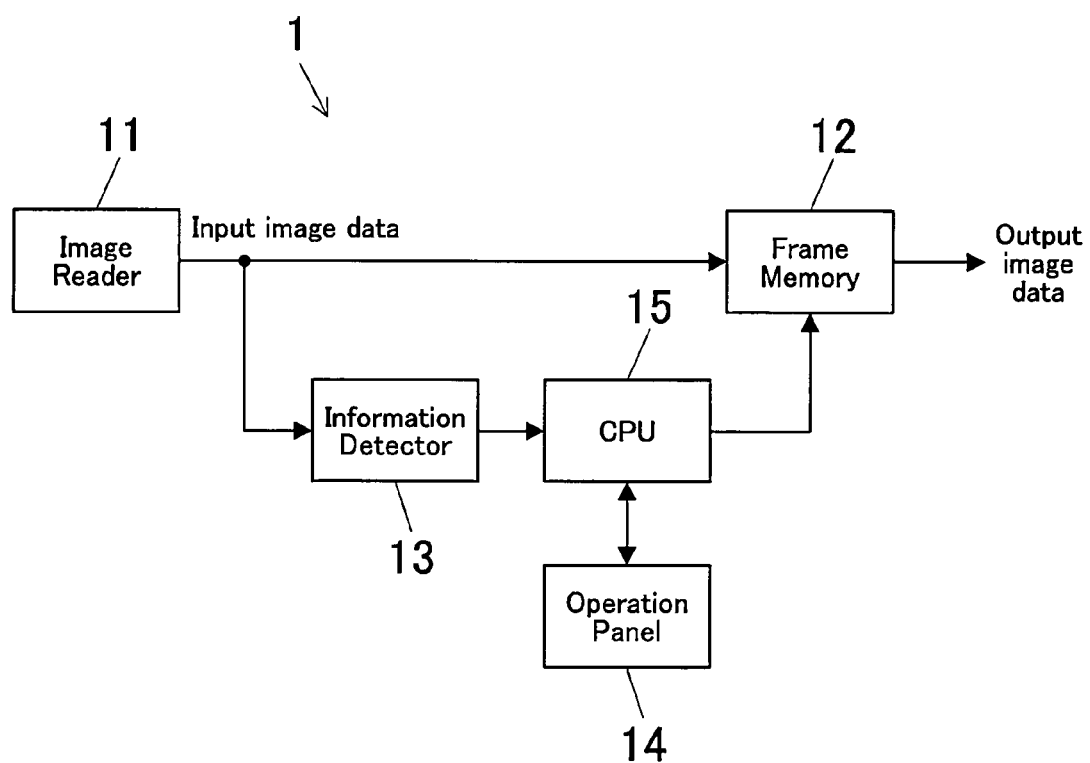
FIG. 1 is a block diagram showing a configuration of an image processing apparatus according to an embodiment of the present invention.
Figure 3:
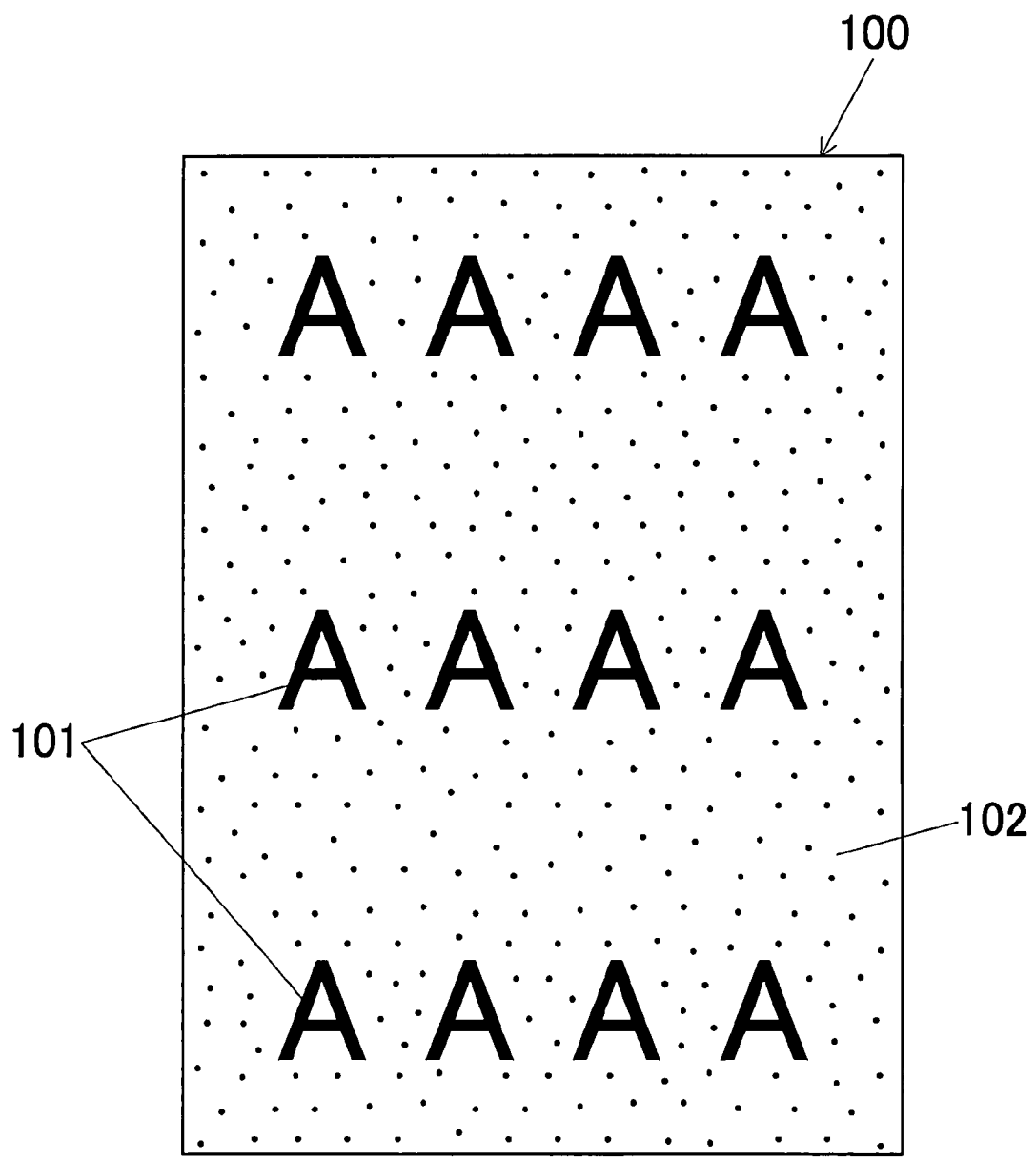
FIG. 3 is a view showing an example of a document to be read by the image processing apparatus shown in FIG. 1 and FIG. 2.

As shown in a block diagram of FIG. 1 illustrating an image processing apparatus according to an embodiment of the present invention, an image processing apparatus 1 reads a document 100 with a certain ground pattern 102 given behind an image 101 thereon, which is shown in FIG. 3, and detects a password from information embedded in the ground pattern 102. As previously described, the image processing apparatus 1 is an image forming apparatus such as a MFP that is a multifunctional digital machine.

The image processing apparatus 1 shown in FIG. 1 comprises an image reader 11, a frame memory 12, an information detector 13, an operation panel 14 and a CPU 15.

The image reader 11 reads an image on the document 100 with a ground pattern, and it is a scanner.

The frame memory 12 temporarily accumulates image data read out from a document by the image reader 11 until the CPU 15 gives permission.

The information detector 13 detects information embedded in a ground pattern given to each page of a document M.

Figure 9:
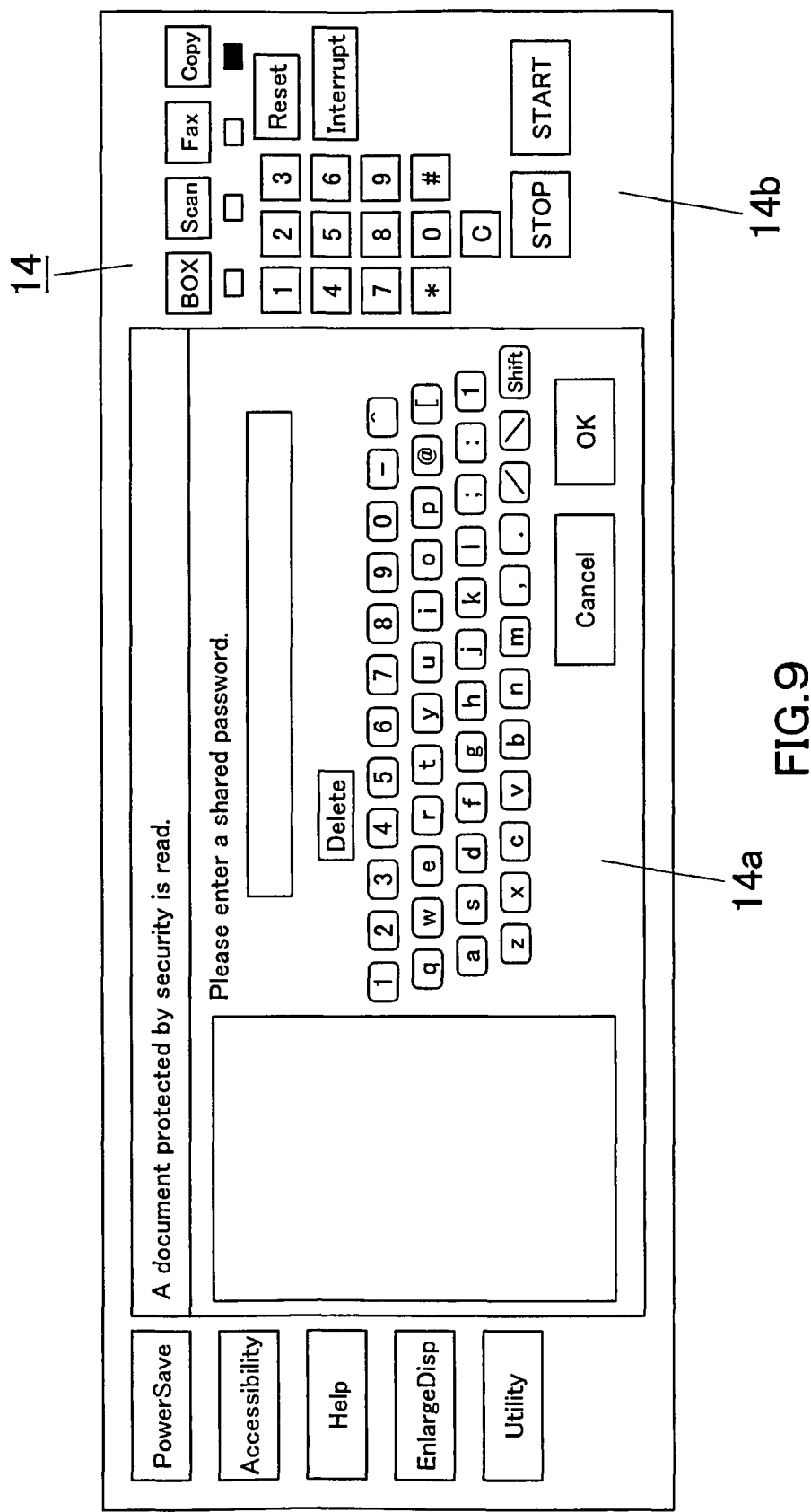
FIG. 9 is a view showing a screen requesting entry of a shared password.
Figure 10:
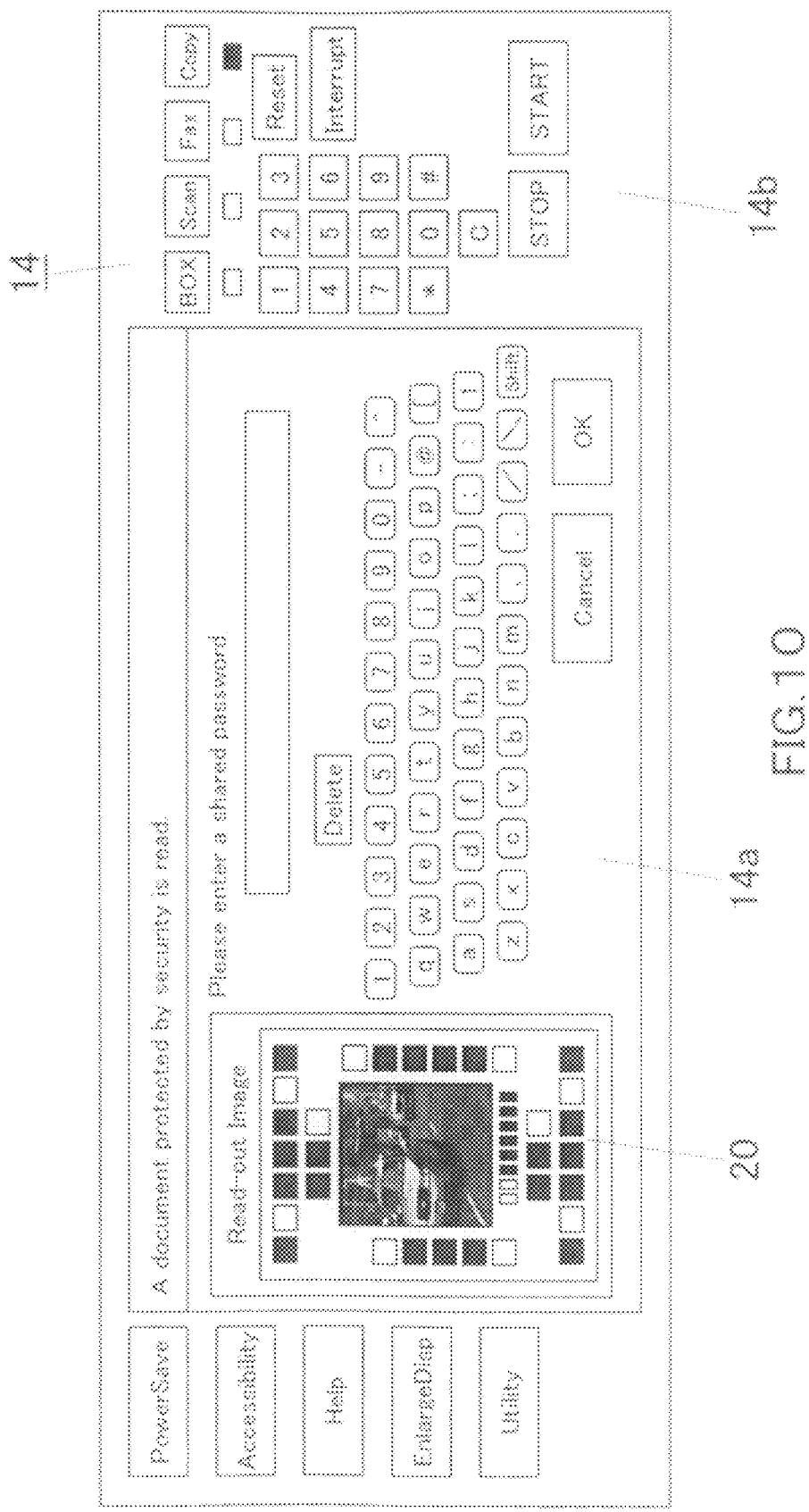
FIG. 10 is a view showing a screen requesting entry of an individual password.

The operation panel 14 is used by users to perform an entry and various operations, and comprises a display 14a, a keyboard 14b and etc., as shown in FIG. 9 and FIG. 10.

The CPU 15 controls the entire image processing apparatus by executing processing according to an operation program stored in a recording medium such as a ROM not shown in Figure. For example, an individual password and a shared password are detected from information detected by the information detector 13. The individual password is assumed herein to be uniquely issued for each page of document, and the shared password is assumed herein to be issued for each page of document in common if one document consists of a plurality of pages.

Further, under the control of the CPU 15, a screen requesting entry of a shared password or an individual password, depending on which password is detected a shared password or an individual password, is displayed on the display 14a of the operation panel 14. If entry of an individual password is requested, a target image needing that password is also displayed thereon. If the appropriate shared password is entered in response to the entry request, image data read out by the image reader 11 from all the pages each having the shared password embedded therein, are permitted to be outputted. On the other hand, if the appropriate individual password is entered about a certain page accordingly, image data read out from that page is permitted to be outputted. The processes controlled by the CPU 15 as described right above will be detailed later.

Figure 2:
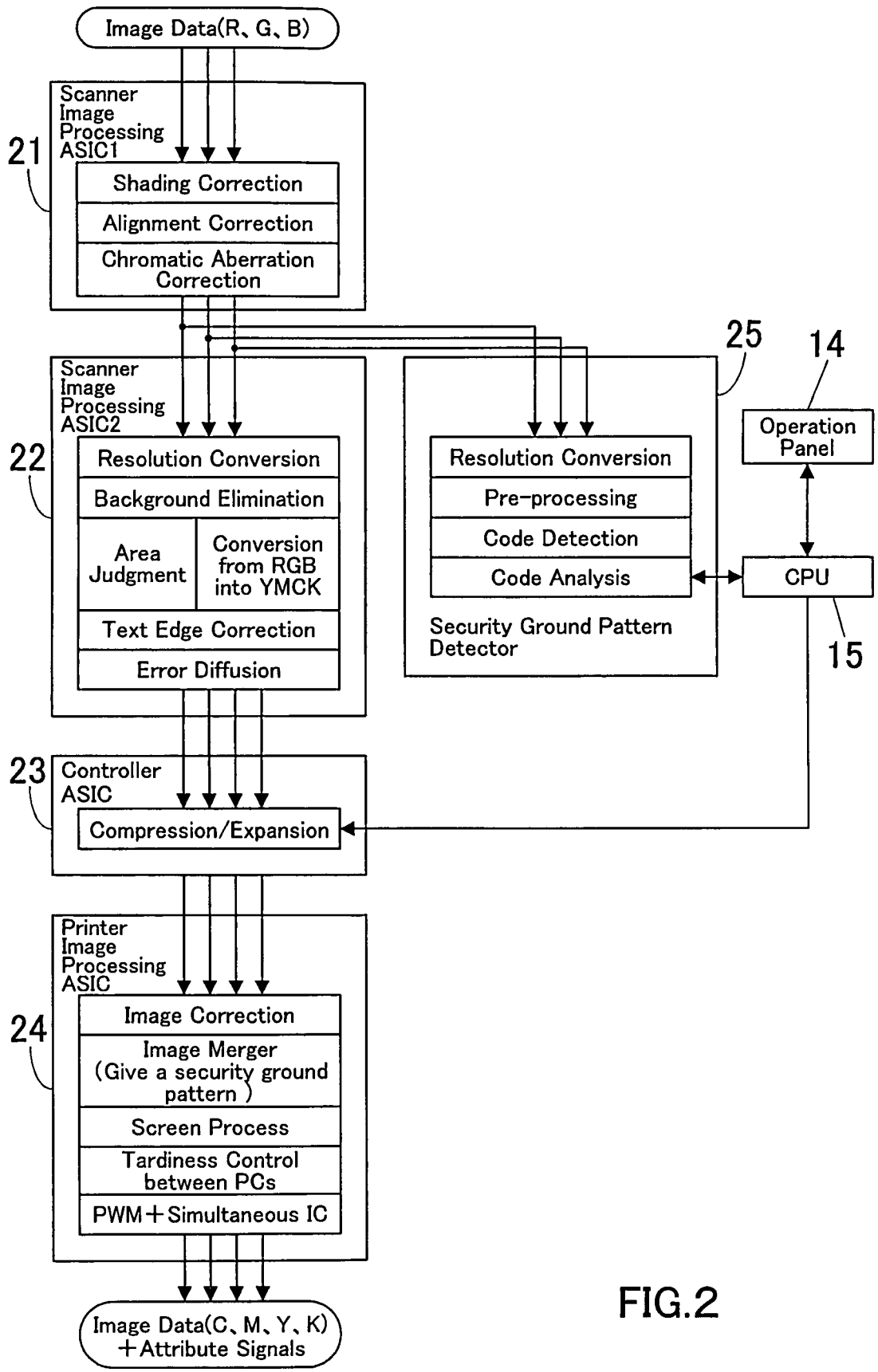
FIG. 2 is a view showing a functional configuration of the image processing apparatus shown in FIG. 1, which is focused on a flow of image data therein.

As shown in a view of FIG. 2 illustrating a functional configuration of the image processing apparatus 1, which is focused on a flow of image data, RGB image data read out by the image reader 11 is inputted into a first scanner image processor 21. The first scanner image processor 21 performs on the inputted image data, shading correction, alignment correction, chromatic aberration correction, and etc.

The image data processed by the first scanner image processor 21 is inputted into a second scanner image processor 22. The second scanner image processor 22 performs on the image data, resolution conversion, background elimination, area judgment, conversion from RGB into YMCK, text edge correction, error diffusion, and etc.

The image data processed by the second scanner image processor 22 is inputted into a controller 23. The controller 23 executes compression/expansion of the image data.

The image data processed by the controller 23 is inputted into a printer image processor 24. The printer image processor 24 performs on the image data to be printed, image correction, image merger (giving a security ground pattern), a screen process and etc., and then outputs the processed image data.

Meanwhile, the image data processed by the first scanner image processor 21 is also inputted into a security ground pattern detector 25 that is the information detector 13. The security ground pattern detector 25 detects from the image data processed by the first scanner image processor 21, the ground pattern 102 in which an individual password and a shared password are embedded. Concretely, resolution conversion, pre-processing, code detection, code analysis, and etc. are performed under the control of the CPU 15, and thereby the ground pattern 102 is detected.

Figure 5:
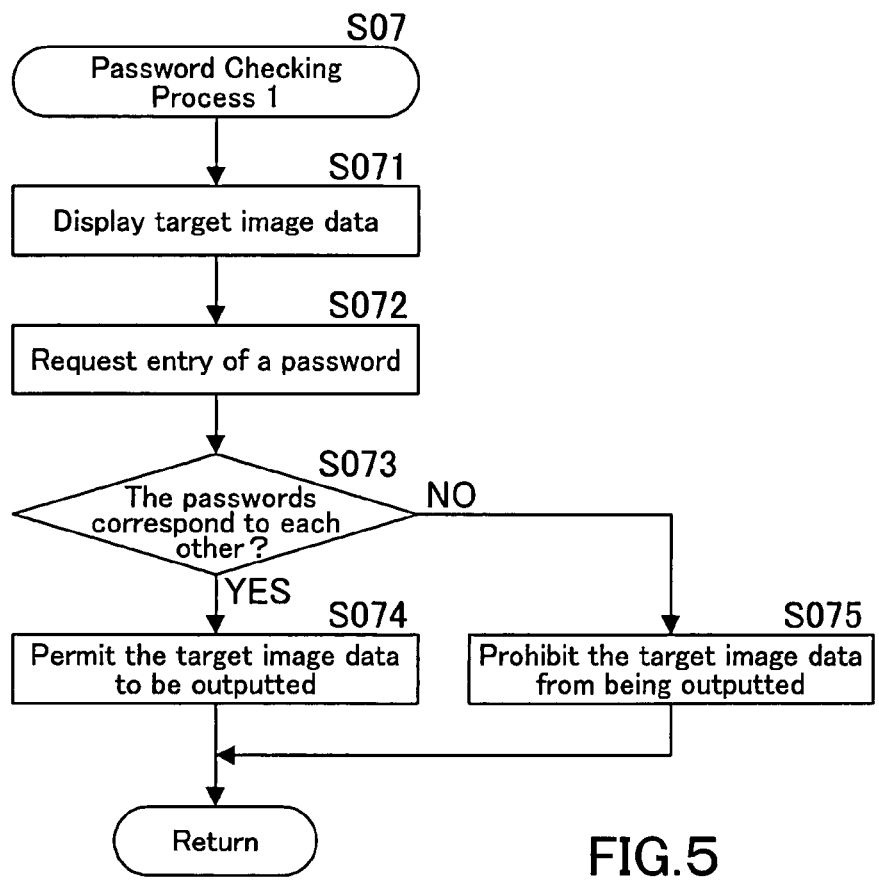
FIG. 5 is a flowchart showing a subroutine of a password checking process 1 shown in the flowchart of FIG. 4.
Figure 6:
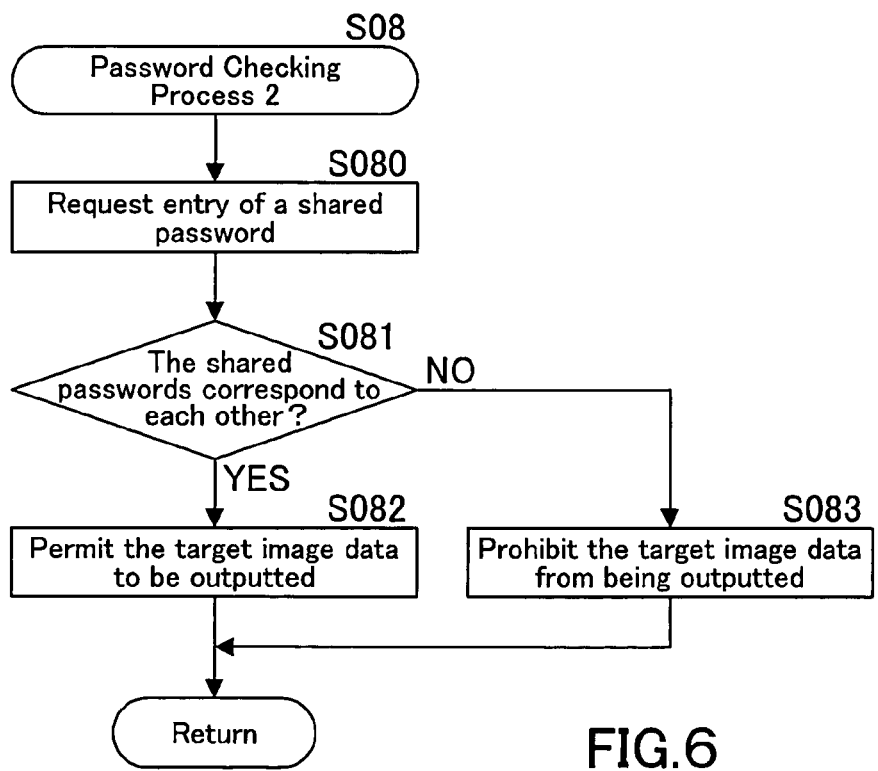
FIG. 6 is a flowchart showing a subroutine of a password checking process 2 shown in the flowchart of FIG. 4.

Hereinafter, a procedure performed in the image processing apparatus 1 shown in FIG. 1 and FIG. 2 to judge output prohibit/permit will be explained with reference to flowcharts of FIG. 4, FIG. 5 and FIG. 6. The procedure is executed by the CPU 15 according to an operation program stored in a recording medium such as a ROM not shown in Figure.

In Step S01, it is judged whether or not a certain ground pattern is included in image data read out from a document by the image reader 11. If a certain pattern is not detected (NO in Step S01), the image data is permitted to be outputted in Step S10, since the document is a normal document not needing to be protected by security.

If a certain pattern is detected (YES in Step S01), information embedded in the certain pattern is detected (Step S02), and then it is judged whether or not a password is included in the detected information (Step S03).

If there exists no password (NO in Step S03), the routine proceeds to Step S10 and the image data is permitted to be outputted.

If there exists a password (YES in Step S03), it is judged whether or not all the pages of document are completely read (Step S04). If all the pages are not completely read (NO in Step S04), the routine returns to Step S01 and repeats Steps from S01 to S04. If all the pages are completely read (YES in Step S04), the routine proceeds to Step S05 and it is judged whether or not a different plurality of passwords are detected from each of image data read out therefrom. If a different plurality of passwords are detected (YES in Step S05), the routine proceeds to Step S06.

In Step S06, it is judged whether or not there exists a shared password given to each of the pages in common. If there exists a shared password (YES in Step S06), the routine proceeds to a password checking process 2 of Step S08. After completing the password checking process 2, the routine terminates.

The password checking process 2 will be detailed with reference to a flowchart shown in FIG. 6. To begin with Step S080, a message requesting entry of a shared password is displayed on the display 14a of the operation panel 14 as shown in FIG. 9. Accordingly, a shared password is entered.

Subsequently, it is judged in Step S081 whether or not the entered password is appropriate, in other words, the entered password and the detected shared password correspond to each other. If these passwords correspond to each other (YES in Step S081), image data of all the pages are permitted to be outputted in Step S082. Then the subroutine returns.

If these passwords do not correspond to each other (NO in Step S081), image data of all the pages are prohibited from being outputted in Step S083. Then the subroutine returns. In this case of output prohibit, the image data stored in the frame memory 12 can be deleted.

Figure 4:
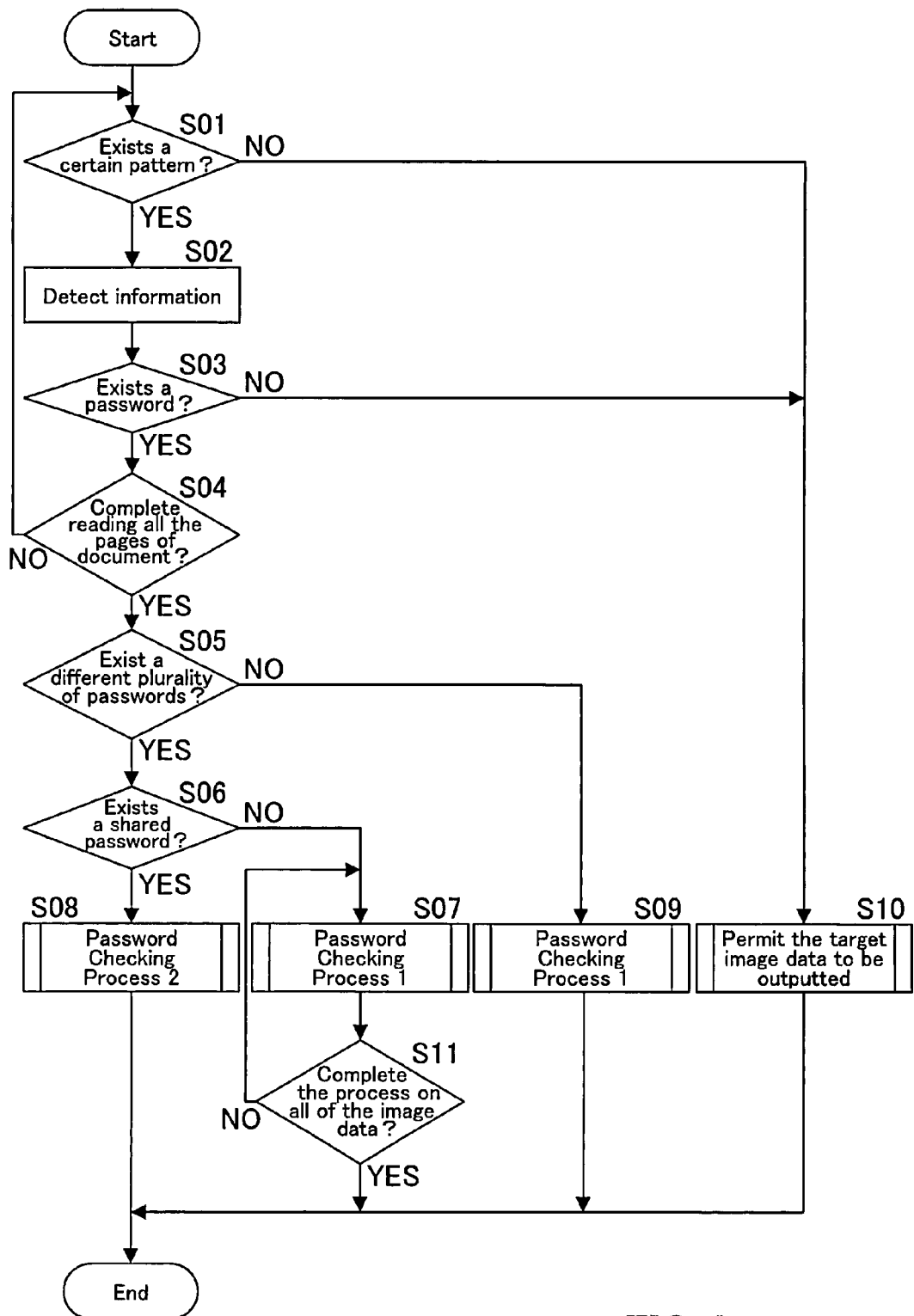
FIG. 4 is a flowchart showing a procedure performed in the image processing apparatus shown in FIG. 1 and FIG. 2, to judge output prohibit/permit.

Back to FIG. 4, if there does not exist a shared password given to each of the pages in common (NO in Step S06), the routine proceeds to a password checking process 1 of Step S07. The password checking process 1 will be detailed with reference to a flowchart shown in FIG. 5.

To begin with Step S071, image data 20 of Page 1 is displayed on the display 14a of the operation panel 14. Further, in Step S072, a message requesting entry of an individual password is also displayed on the display 14a. Accordingly, an individual password is entered.

Subsequently, it is judged in Step S073 whether or not the entered password is appropriate, in other words, the entered password and the individual password detected from Page 1 correspond to each other. If these passwords correspond to each other (YES in Step S073), the image data is permitted to be outputted in Step S074. Then the subroutine returns.

If these passwords do not correspond to each other (NO in Step S073), the image data is prohibited from being outputted in Step S075. Then the subroutine returns. In this case of output prohibit, the image data stored in the frame memory 12 can be deleted.

In this way, the password checking process 1 is completed. Then in Step S11 of FIG. 4, it is judged whether or not there exists image data of a following page. If there exists image data of a following page, (NO in Step S11), the routine returns to the password checking process 1 of Step S07 and performs it again. Accordingly, about each of the pages, an individual password is entered and output prohibit/permit is determined.

In Step S11 of FIG. 4, if it is completely determined about all the pages, whether or not to permit the image data to be outputted (YES in Step S11), the routine terminates.

Further, in Step S05 of FIG. 4, if a different plurality of passwords are not detected, in other words, if only one individual password is detected (NO in Step S05), the routine proceeds to the password checking process 1 of Step S09. After completing the password checking process 1, the routine terminates. Details about the password checking process 1 herein are omitted since it is the same as the one explained above with FIG. 5.

After completing the routine, image data permitted to be outputted is printed by a printer or other not shown in Figure.

As described above in this embodiment, if each page of document has a shared password, image data of all the pages are permitted to be outputted, by one user operation to enter the shared password. In other words, image data of all the pages are outputted by a simple user operation, not by many user operations to repeat entering a password about each of the pages, which improves conveniences of right users, etc. Further, a shared password is embedded in a document and a shared password to be embedded can be changed with respect to each document. Thus, users who can enter the appropriate shared password are limited, which could prevent a document from being abusively outputted and ensures higher security.

Meanwhile, if it is judged that a shared password is not detected, entry of an individual password is requested about each of the pages. If the appropriate individual password is entered about a certain page, image data of that page is permitted to be outputted. In this embodiment, an individual password is requested to be entered about each of the pages and individual passwords to be embedded in the respective pages can be differentiated from each other. Thus, users who can enter the appropriate individual password are limited, which ensures higher security.

Figure 7:
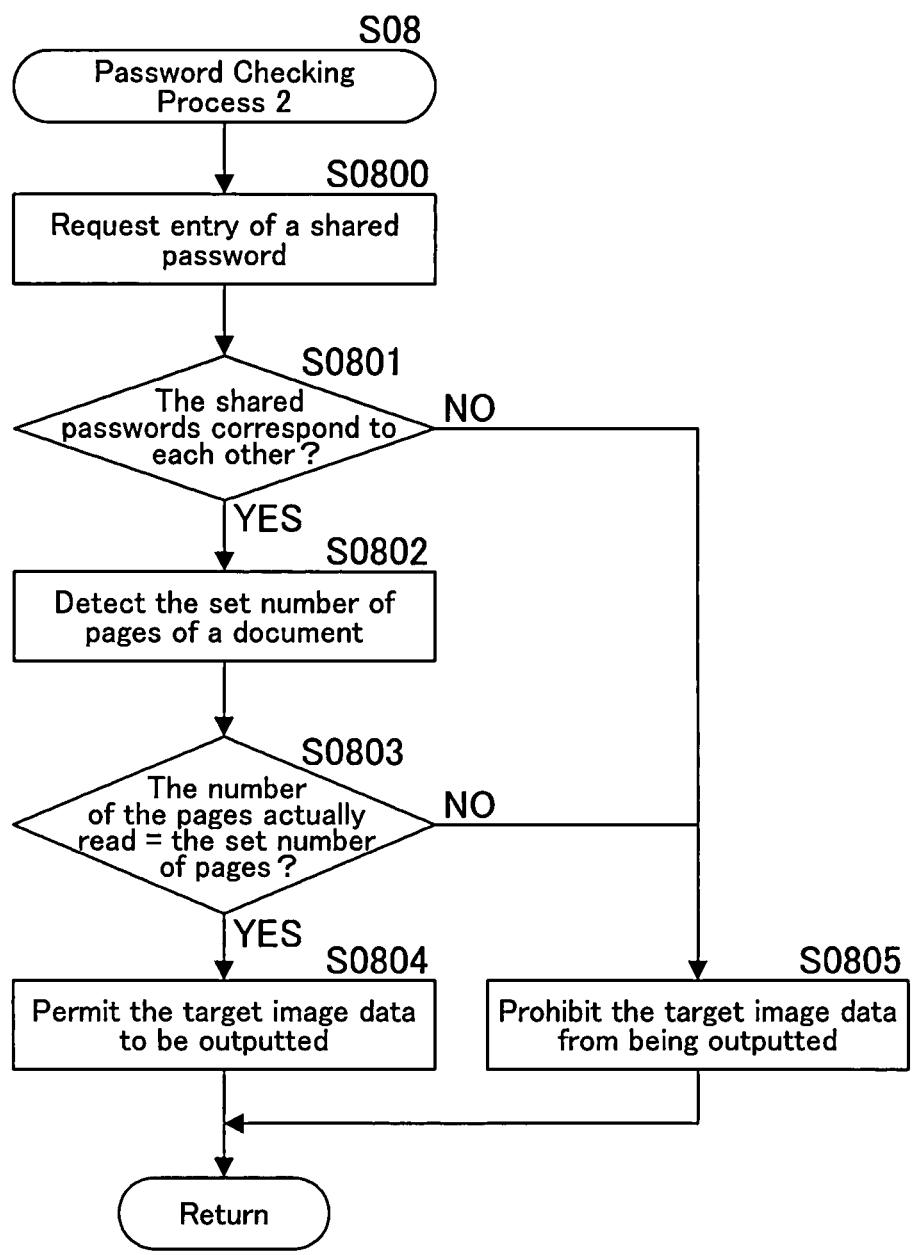
FIG. 7 is a flowchart showing another example of the password checking process 2.

FIG. 7 is a flowchart showing another example of the password checking process 2 (Step S08 of FIG. 4). In this embodiment, it is configured such that the number of pages (image data) to be inputted is set in advance on a shared password, wherein if the number of pages, which is set in advance, and the number of actual pages (the number of image data actually inputted) do not correspond to each other, then the image data stored in the frame memory 12 is prohibited from being outputted, by the CPU 15.

To begin with Step S0800, a message requesting entry of a shared password is displayed on the display 14a of the operation panel 14 as shown in FIG. 9. Accordingly, a shared password is entered.

Subsequently, it is judged in Step S0801 whether or not the entered password and the detected shared password correspond to each other. If these passwords correspond to each other (YES in Step S0801), the subroutine proceeds to Step S0802.

In Step S0802, the number of pages, which is set in advance on the shared password, is detected. Then, it is judged in Step S0803 whether or not the detected number of pages and the number of the pages actually read correspond to each other. If these numbers correspond to each other (YES in Step S0803), image data of all the pages are permitted to be outputted in Step S0804. Then the subroutine returns.

If the detected number of pages and the number of the pages actually read do not correspond to each other (NO in Step S0803), image data of all the pages are prohibited from being outputted in Step S0805. Then the subroutine returns. Similarly, in Step S0801, if the passwords do not correspond to each other (NO in Step S0801), image data of all the pages are prohibited from being outputted in Step S0805. In this case of output prohibit, the image data stored in the frame memory 12 can be deleted.

Alternatively, it can be configured such that the orders of Steps S0800 and S0801 and Steps S0802 and S0803 are replaced with each other, wherein entry of a shared password is requested (Step S0800) if the number of pages, which is set in advance, and the number of pages actually read correspond to each other (YES in Step S0803), meanwhile, the target image data is immediately prohibited from being outputted (Step S0805) without requesting entry of a shared password, if these numbers do not correspond to each other (NO in Step S0803).

As described above in this embodiment, if the number of pages of document, which is set in advance on a shared password, and the number of actual pages of document do not correspond to each other, then image data of all the pages are prohibited from being outputted, which ensures higher security.

Figure 8:
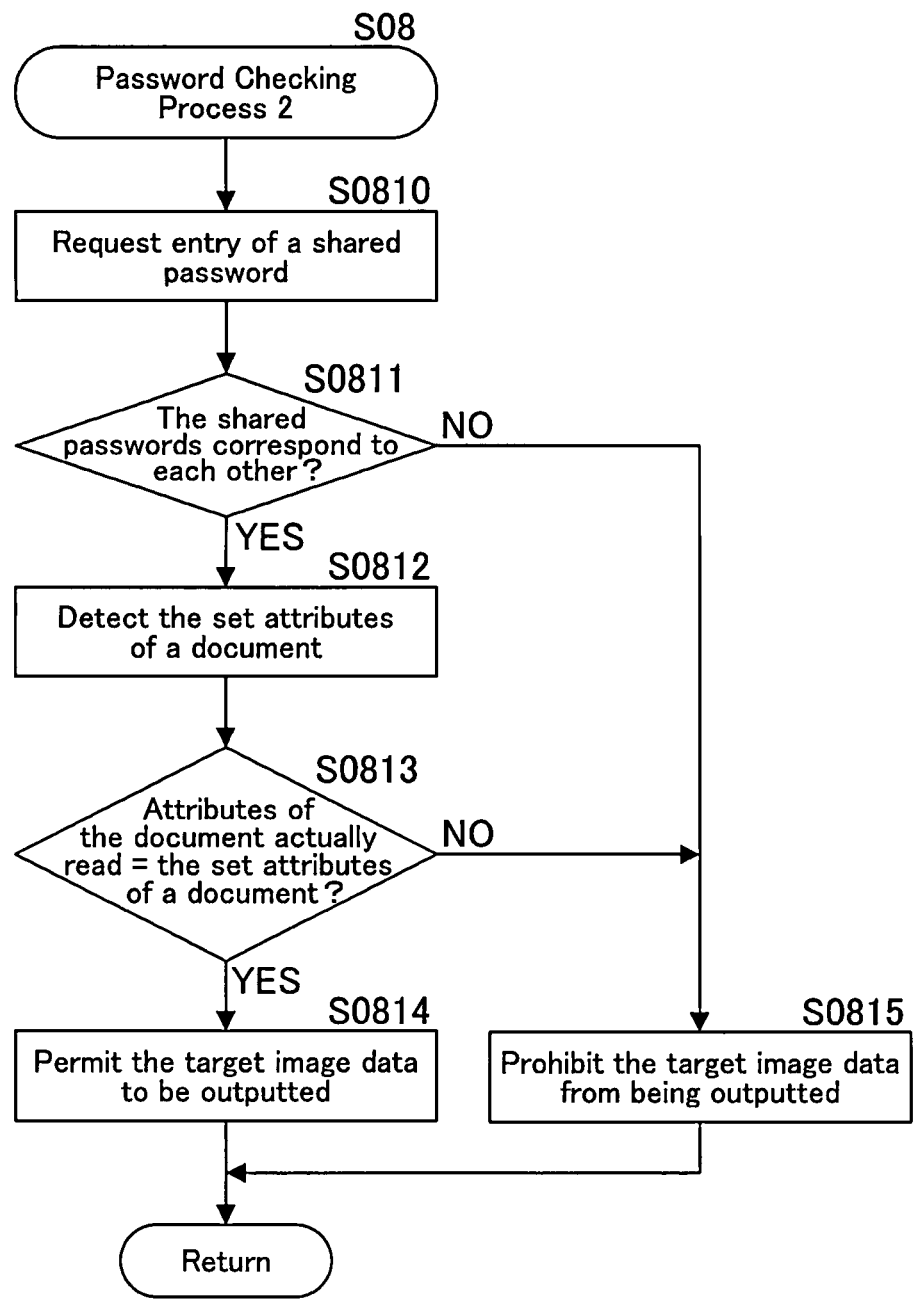
FIG. 8 is a flowchart showing yet another example of the password checking process 2.

FIG. 8 is a flowchart showing yet another example of the password checking process 2 (Step S08 of FIG. 4). In this embodiment, it is configured such that attributes of a document are set on a shared password in advance, wherein if the attributes of a document, which are set in advance, and attributes of the actual document do not correspond to each other, then the image data stored in the frame memory 12 is prohibited from being outputted, by the CPU 15.

The attributes of a document includes e.g. size, data format, time stamp, and kind of document such as text or picture, of the image data. Further, those include kind of sheet, sheet size, and others, of a document to be read by the image reader 11.

To begin with Step S0810, a message requesting entry of a shared password is displayed on the display 14a of the operation panel 14 as shown in FIG. 9. Accordingly, a shared password is entered.

Subsequently, it is judged in Step S0811 whether or not the entered password and the detected shared password correspond to each other. If these passwords correspond to each other (YES in Step S0811), the subroutine proceeds to Step S0812.

In Step S0812, the attributes of a document, which are set in advance on the shared password, are detected. Then, it is judged in Step S0813 whether or not the detected attributes of a document and attributes of the document actually read correspond to each other. If these attributes correspond to each other (YES in Step S0813), image data of all the pages of document are permitted to be outputted in Step S0814. Then the subroutine returns.

If the detected attributes of a document and attributes of the document actually read do not correspond to each other (NO in Step S0811), image data of all the pages are prohibited from being outputted in Step S0815. In this case of output prohibit, the image data stored in the frame memory 12 can be deleted.

Alternatively, it can be configured such that the orders of Steps S0810 and S0811 and Steps S0812 and S0813 are replaced with each other, wherein entry of a shared password is requested (Step S0810) if the attributes of a document, which are set in advance, and the attributes of the document actually read correspond to each other (YES in Step S0813), meanwhile, the target image data is immediately prohibited from being outputted (Step S0815) without requesting entry of a shared password, if these attributes of the document do not correspond to each other (NO in Step S0813).

As described above in this embodiment, if attributes of a document, which are set in advance on a shared password, and attributes of a document actually read do not correspond to each other, then image data of all the pages of document are prohibited from being outputted, which ensures higher security.

Hereinafter, another embodiment of the present invention will be explained. This embodiment relates to an image processing apparatus that generates a shared password or an individual password if each plurality of pages of document read by the image reader 11 does not have it, and then embeds the generated shared password or individual password as a ground pattern behind image data read out from a document, which are to be outputted.

Figure 11:
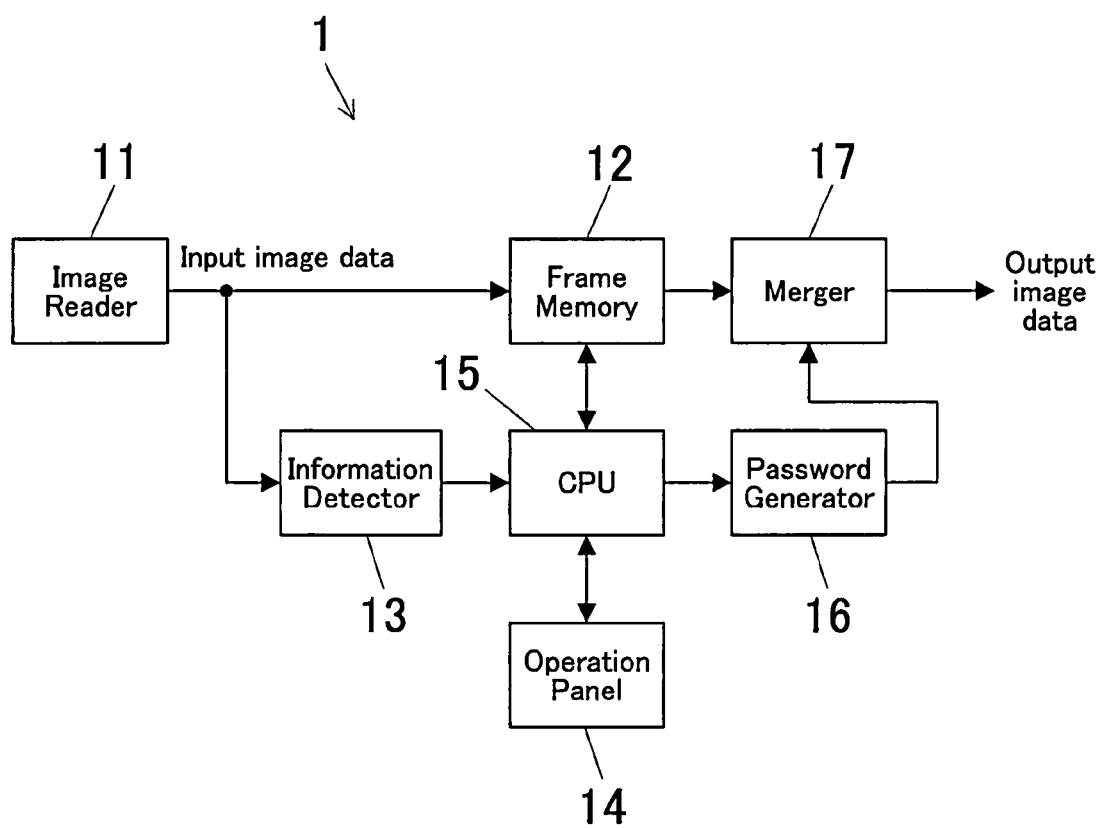
FIG. 11 is a block diagram showing a configuration of an image processing apparatus according to another embodiment of the present invention.

FIG. 11 is a block diagram showing the image processing apparatus 1. The image processing apparatus 1 in this embodiment is also an image forming apparatus such as a MFP.

As shown in FIG. 11, the image processing apparatus 1 comprises an image reader 11, a frame memory 12, an information detector 13, an operation panel 14, a CPU 15, a password generator 16 and a merger 17.

The image reader 11, the frame memory 12, the information detector 13, the operation panel 14 and the CPU 15 in this embodiment have the same functions as those in the other image processing apparatus shown in FIG. 1. Therefore, those explanations are omitted.

The password generator 16 generates a shared password based on an individual password uniquely issued for each page of document, and also generates an individual password based on a shared password.

The merger 17 merges the shared password and the individual password generated by the password generator 16, to image data that is read out by the image reader 11 and stored in the frame memory 12.

Figure 12:
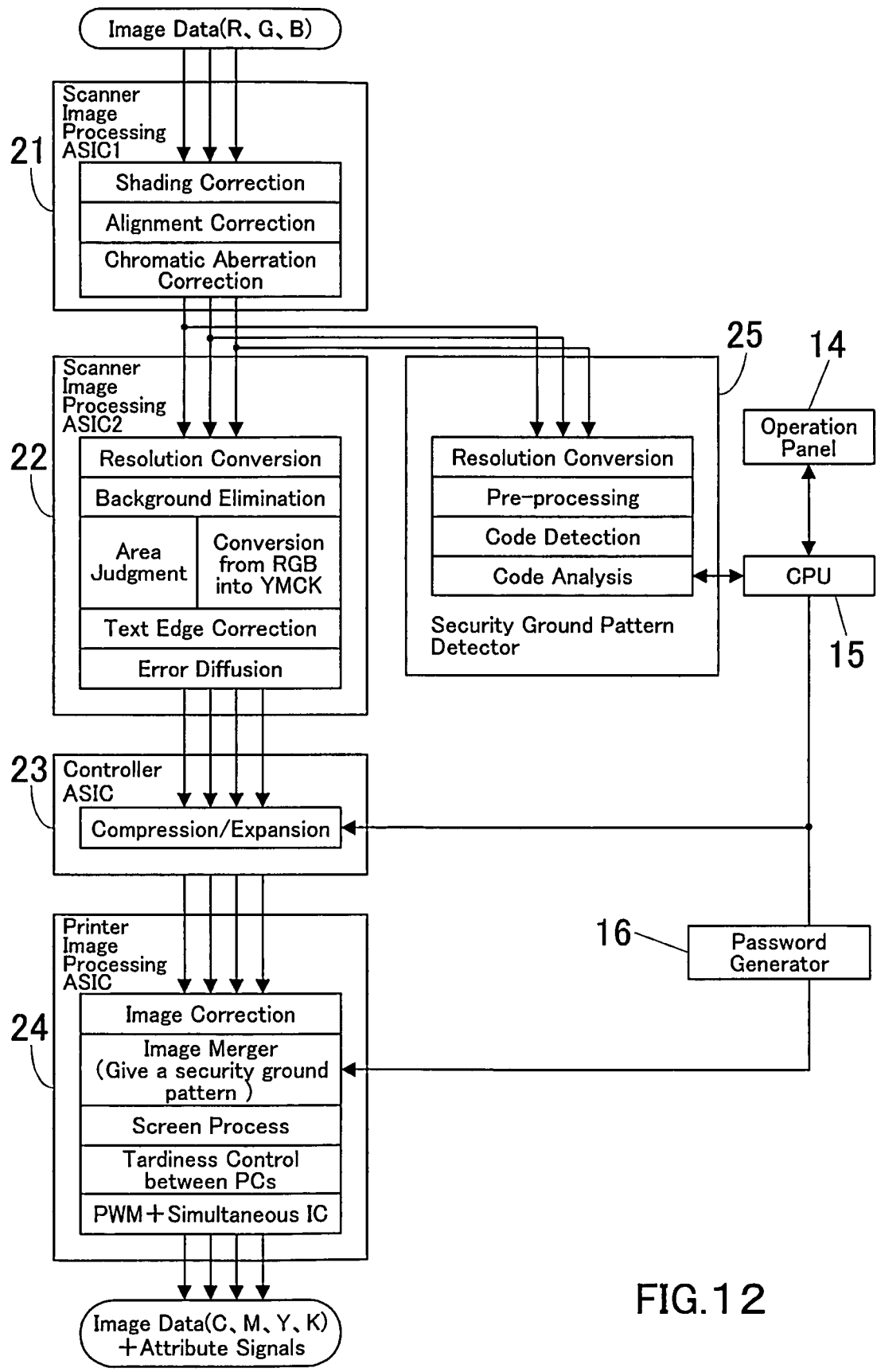
FIG. 12 is a view showing a functional configuration of the image processing apparatus shown in FIG. 11, which is focused on a flow of image data therein.

FIG. 12 is a view showing a functional configuration of the image processing apparatus 1, which is focused on a flow of image data therein. This is the same as FIG. 2 in the major portion, and still different from FIG. 2 in the rest of portion as following. That is, the password generator 16 is newly provided in the configuration shown in FIG. 12, wherein the shared password and the individual password generated by the password generator 16 are embedded in a certain ground pattern behind image data.

Figure 13:
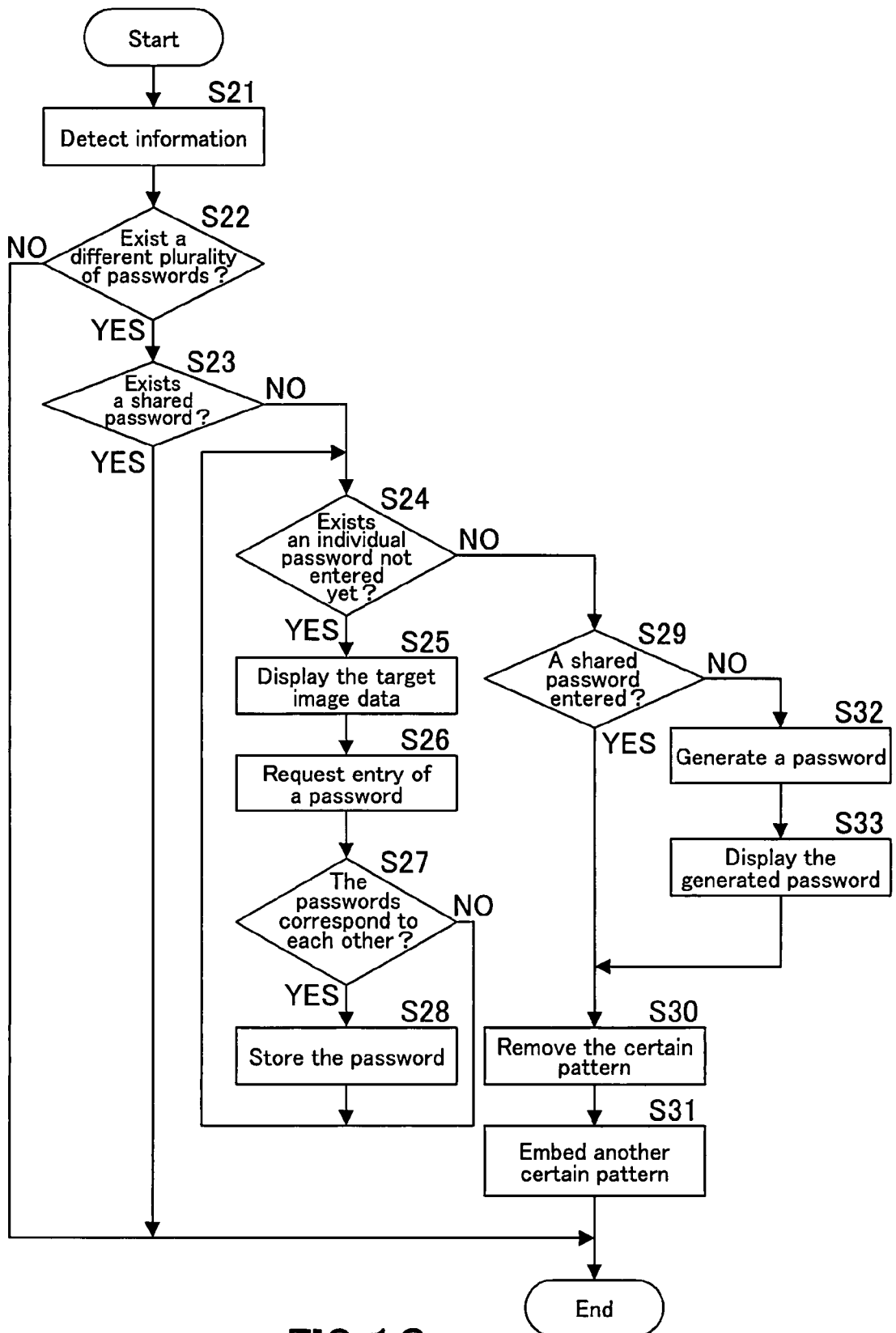
FIG. 13 is a flowchart showing a procedure performed in the image processing apparatus shown in FIG. 11 and FIG. 12, to generate and embed a password.

Hereinafter, a procedure performed in the image processing apparatus shown in FIG. 11 and FIG. 12, to generate and embed a shared password, will be explained with reference to a flowchart shown in FIG. 13. The procedure is executed by the CPU 15 according to an operation program stored in a recording medium such as a ROM not shown in Figure.

In Step S21, if a certain pattern is included in inputted data, information is detected from the pattern, then a password is further detected from the information.

In Step S22, it is judged whether or not a different plurality of passwords are detected from the plurality of inputted image data. If a different plurality of passwords are not detected (NO in Step S22), the routine terminates. If a different plurality of passwords are detected (YES in Step S22), it is judged in Step S23 whether or not there exists a shared password.

If a shared password is detected (YES in Step S23), the routine terminates since another shared password is not needed to be embedded.

If a shared password is not detected (NO in Step S23), it is judged in Step S24 whether or not there exists an individual password not entered yet, so that entry of an individual password could be requested.

If there exists an individual password not entered yet (YES in Step S24), target image data is displayed on the display 14a of the operation panel 14 as shown in FIG. 10, in Step S25. In Step S26, a message requesting entry of an individual password is also displayed on the display 14a. Accordingly, an individual password is entered about that image data.

Subsequently, it is judged in Step S27 whether or not the entered password and a password given to that image data correspond to each other. If these passwords correspond to each other (YES in Step S27), the password and the image data are stored in Step S28, and then the routine returns to Step S24. The stored password will be used when a shared password is generated in Step S32, which will be described later. If these passwords do not correspond to each other (NO in Step S27), the routine immediately returns to Step S24.

In this way, Steps S24 through S28 are repeated about image data of each of the pages until it is judged that there exists no individual password not entered yet. If a password is completely entered about image data of each of the pages (NO in Step S24), the routine proceeds to Step S29.

In Step S29, it is judged whether or not a shared password is entered by a user. If a shared password is not entered (NO in Step S29), a shared password is newly generated based on the stored password in Step S32, and the generated password is displayed on the display 14a to let the user know in Step S33, and then the routine proceeds to Step S30. If a shared password is entered by a user (YES in Step S29), the routine immediately proceeds to Step S30.

To generate a shared password newly, the following methods can be employed for example.

Merge the respective individual passwords.

Merge the highest or the lowest bits of the respective individual passwords.

Merge checksums of the respective individual passwords.

Sum values of the respective individual passwords.

Merge just portions picked up from the respective individual passwords according to a predetermined rule.

In Step S30, the certain ground pattern is removed from the image data permitted to be outputted. Then in Step S31, another certain ground pattern having embedded information that is the shared password entered by the user or automatically generated and the individual password, is generated, and then this ground pattern is embedded again in the image data permitted to be outputted. Alternatively, it can be configured such that the original certain ground pattern is not removed and only the shared password is embedded therein, since the individual password is already embedded therein.

As described above in this embodiment, a shared password is embedded in image data of each page of document, having an individual password only. And this procedure enables creating a document consisting of pages each having an individual password and a shared password.

Figure 14:
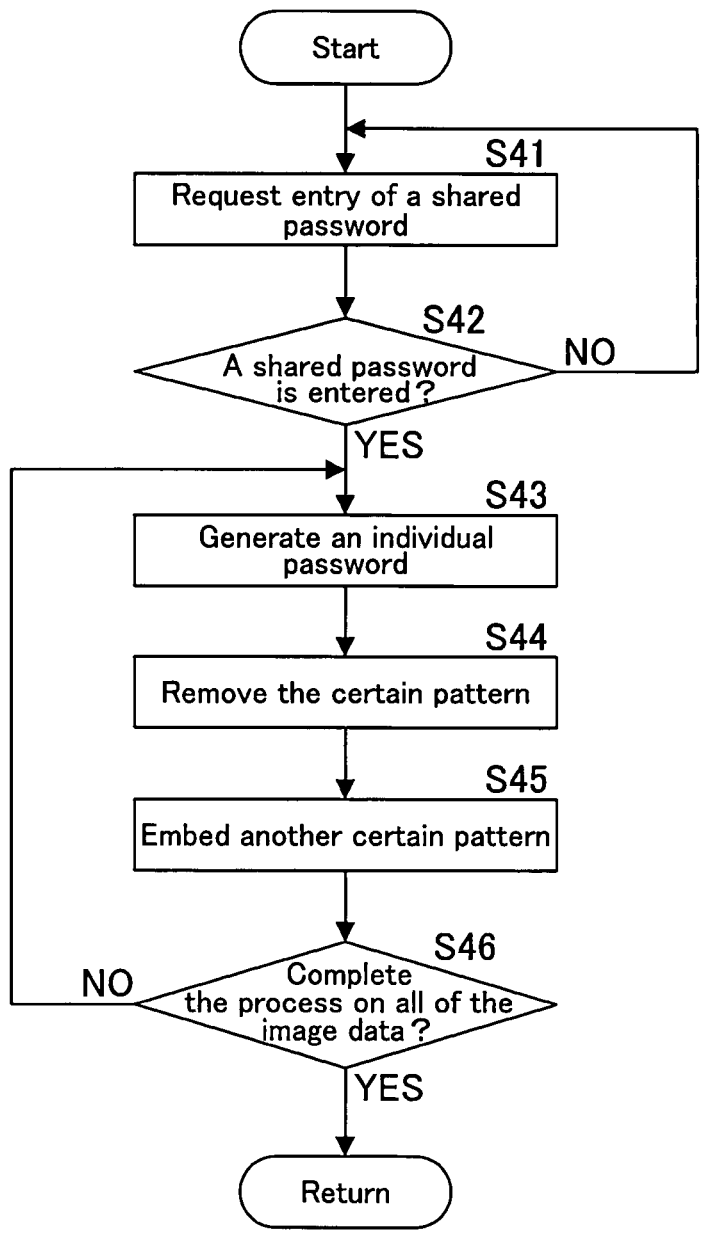
FIG. 14 is a flowchart showing a procedure performed in the image processing apparatus shown in FIG. 11 and FIG. 12, to generate an individual password then embed the individual password and a shared password.

Hereinafter, a procedure performed in the image processing apparatus 1 shown in FIG. 11 and FIG. 12 to generate an individual password then embed the individual password and a shared password, will be explained with reference to a flowchart shown in FIG. 14. The procedure is executed by the CPU according to an operation program stored in a recording medium such as a ROM not shown in Figure.

In Step S41, a user is requested to enter a password and that should be a shared password. Then it is judged in Step S42 whether or not a password is entered. If the appropriate shared password is not entered (NO in Step S42), the routine returns to Step S41 and entry is required again. If the appropriate shared password is entered (YES in Step S42), then an individual password is generated for each plurality of target pages of document in Step S43.

To generate an individual password, the following methods can be employed for example.

Add a serial number to the shared password.

Combine the highest bit or the lowest bit of the shared password with a number generated according to a predetermined rule.

Combine a checksum of the shared password with a number generated according to a predetermined rule.

Create out of a feature quantity (such as a histogram or the total number of characters) of target image data.

Subsequently, in Step S44, the certain ground pattern is removed from the image data permitted to be outputted. And in Step S45, another certain ground pattern having embedded information that is the shared password entered in Step S41 and the individual password newly generated in Step S43, is created, and then this ground pattern is embedded in the image data again.

Then, it is judged in Step S46 whether or not the process is completely performed on all of the image data. Steps from password generation of Step S43 through password embedding of Step S45 are repeated until the process is completely performed on all of the target image data.

This procedure enables creating a document consisting of pages each having a shared password and an individual password embedded therein.

Each of the embodiments described above is just one embodiment of the present invention, and the present invention is not limited to these embodiments.

For example, in these embodiments, a certain ground pattern having information that is a shared password and an individual password embedded therein is given to each page. Alternatively, a certain ground pattern having an embedded shared password and individual password is not given to each page, but an IC tag storing these passwords or an identification mark indicating these passwords can be given to each page.

In these embodiments, the following image processing apparatuses, image processing methods and recording mediums are disclosed.

(1) An image processing apparatus comprising:

an input portion that inputs image data of a plurality of pages of document;

a password detector that detects a password given to each of the pages;

a password judger that judges from a detecting result drew by the password detector about each of the pages, whether or not a shared password issued for each page in common is detected in addition to an individual password uniquely issued for each page;

an entry requester that requests entry of a shared password if it is judged by the password detector that a shared password is detected, and requests entry of an individual password about each of the pages if it is judged by the password detector that a shared password is not detected; and an output permitting portion that permits image data of all the pages each having a shared password, which is the image data inputted by the input portion, if the appropriate shared password is entered in response to the request for entry of a shared password, and permits image data of a page having an individual password, if the appropriate individual password is entered about that page in response to the request for entry of an individual password.

With this image processing apparatus, a password given to each of the pages is detected, and then it is judged from the detecting result whether or not a shared password issued for each plurality of pages in common is detected in addition to an individual password uniquely issued for each page. If it is judged that a shared password is detected, entry of a shared password is requested. If the appropriate shared password is entered in response to the request, image data inputted by an input part, in other words, image data of all the pages each having the shared password is permitted to be outputted. Thus, when a user such as a right user would like to output a document having a password, he/she obtains all the pages outputted, by a simple operation that is entering a shared password, not by entering a password about each of the pages. Further, since a shared password is given to a document and a shared password to be given thereto can be changed everytime a job instruction is given, users who can enter the appropriate shared password are limited, which could prevent a document from being abusively outputted and ensures higher security.

On the other hand, if it is judged that a shared password is not detected, entry of an individual password is requested about each of the pages. If the appropriate individual password is entered about a certain page, image data of that page is permitted to be outputted. Since a password is requested about each of the pages and individual passwords to be given to respective pages can be differentiated to each other, users who can enter the appropriate individual passwords are limited, which ensures higher security.

(2) Another configuration can be applied to this image processing apparatus, wherein the number of pages to be processed at one time is set in advance on a shared password, and the output permitting portion prohibits image data of all the pages from being outputted, if the number of the pages which image data are inputted by the input portion is different from that number set in advance.

With this image processing apparatus, the number of pages to be processed at one time is set in advance on a shared password, and image data of all the pages are prohibited from being outputted if the number of pages which image data are inputted by an input portion is different from that number set in advance, which ensures higher security.

(3) Further, another configuration can be applied to this image processing apparatus, wherein attributes of pages to be processed at one time are set in advance on a shared password, and the output permitting portion prohibits the image data of all the pages from being outputted, if attributes of the pages which image data are inputted by the input portion include any attribute different from those attributes set in advance.

With this image processing apparatus, attributes of pages to be processed at one time are set on a shared password, and image data of all the pages are prohibited from being outputted if attributes of pages which image data are inputted by an input portion include any attribute different from those attributes set in advance, which ensures higher security.

(4) An image processing apparatus comprising:
an input portion that inputs image data of a plurality of pages of document;
a password detector that detects an individual password uniquely issued for each page, which is given to each of the pages;
a password giving portion that gives to each sheet to be outputted, a shared password issued for each page in common, after the password detector detects the individual password given to each of the pages; and
a display that displays the shared password.

With this image processing apparatus, if an individual password given to each of the pages is detected, a shared password issued for each plurality of pages in common is given to each sheet to be outputted. In this way, a document consisting of pages each having an individual password and a shared password given thereto is created.

(5) Another configuration can be applied to this image processing apparatus further comprising an entry requester that requests entry of an individual password about each of the pages if the password detector detects the individual password given to each of the pages, wherein the password giving portion generates a shared password based on the individual password entered in response to the entry request and also gives it to each sheet to be outputted.

With this image processing apparatus, if an individual password given to each of the pages is detected, entry of an individual password is requested about each of the pages, and a shared password issued for each page in common is generated based on the entered individual password, and then given to each sheet to be outputted.

(6) Further, another configuration can be applied to this image processing apparatus, wherein if the password detector detects the individual password given to each of the pages, the password giving portion requests entry of a shared password issued for each plurality of pages in common and also gives the shared password entered in response to the entry request to each sheet to be outputted.

With this image processing apparatus, if an individual password given to each of the pages is detected, entry of a shared password issued for each plurality of pages in common is requested, and then the entered shared password is given to each sheet to be outputted.

(7) An image processing apparatus comprising:
an accepter that accepts entry of a shared password;
a generator that generates an individual password uniquely issued for each page based on the entered shared password, and the number of individual passwords generated herein is the same as that of image data to be outputted;
a display that displays the generated individual password; and
a giving portion that gives the generated individual password and the shared password to each of the image data to be outputted.

With this image processing apparatus, an individual password uniquely issued for each page is generated for each image data to be outputted, based on a shared password entered from outside, and the number of individual passwords generated herein is the same as that number of the image data, and then the generated individual password and the shared password are given to each of the image data. In this way, a document consisting of a plurality of pages each having an individual password and a shared password is created.

(8) An image processing method comprising:
inputting image data of a plurality of pages of document;
detecting a password given to each of the pages;
judging from the password detecting result whether or not a shared password issued for each plurality of pages in common is detected in addition to an individual password uniquely issued for each page;
requesting for entry of a shared password if it is judged in the password judging step that a shared password is detected, and requesting for entry of an individual password about each of the pages if it is judged in the password judging step that a shared password is not detected; and
permitting image data of all the pages each having a shared password, which is the image data inputted in the inputting step, to be outputted if the appropriate shared password is entered in response to the request for entry of a shared password, and permitting image data of a page having an individual password, to be outputted if the appropriate individual password is entered about that page in response to the request for entry of an individual password.

With this image processing method, when a user such as a right user would like to output a document having a password, he/she obtains all the pages outputted, by a simple operation that is entering a shared password, not by entering a password about each o the pages. Further, since a shared password is given to a document and a shared password to be given thereto can be changed everytime a job instruction is given, which ensures higher security.

(9) Another configuration can be applied to this image processing method, wherein the number of pages to be processed at one time is set in advance on a shared password, and the image data of all the pages are prohibited from being outputted in the output permitting step, if the number of the pages which image data are inputted in the inputting step is different from that number set in advance.

With this image processing method, if the number of pages which image data are inputted is different from that number set in advance on a shared password, image data of all the pages are prohibited from being outputted, which ensures higher security.

(10) Further, another configuration can be applied to this image processing method, wherein attributes of pages to be processed at one time are set in advance on a shared password, and the image data of all the pages are prohibited from being outputted in the output permitting step, if attributes of the pages which image data are inputted in the inputting step include any attribute different from those attributes set in advance.

With this image processing method, if attributes of pages which image data are inputted in the inputting step include any attribute different from those attributes set in advance on a shared password, image data of all the pages are prohibited from being outputted, which ensures higher security.

(11) An image processing method comprising:
inputting image data of a plurality of pages of document;
detecting an individual password uniquely issued for each page, which is given to each of the pages;
giving to each sheet to be outputted, a shared password issued for each plurality of pages in common, after detecting the individual password given to each of the pages; and
displaying the shared password.

With this image processing method, a document consisting of pages each having an individual password and a shared password is created.

(12) Another configuration can be applied to this image processing method further comprising requesting entry of a shared password issued for each plurality of pages in common if the individual password given to each of the pages is detected in the password detecting step, wherein a shared password is generated based on the individual password entered in response to the entry request and also given to each sheet to be outputted, in the password giving step.

With this image processing method, a shared password is generated based on an entered individual password, and then given to each sheet to be outputted.

(13) Further, another configuration can be applied to this image processing method, wherein if the individual password given to each of the pages is detected in the password detecting step, entry of a shared password issued for each plurality of pages in common is requested and also the shared password entered in response to the entry request is given to each sheet to be outputted, in the password giving step.

With this image processing method, an entered shared password is given to each sheet to be outputted.

(14) An image processing method comprising:
accepting entry of a shared password;
generating an individual password uniquely issued for each page based on the entered shared password, and the number of individual passwords generated herein is the same as that of image data to be outputted;
displaying the generated individual password; and
giving the generated individual password and the shared password to each of the image data to be outputted.

With this image processing method, a document consisting of a plurality of pages each having an individual password and a shared password is created.

(15) A recording medium having an image processing program stored therein to make a computer of an image processing apparatus execute:
inputting image data of a plurality of pages of document;
detecting a password given to each of the pages;
judging from the password detecting result that a shared password issued for each plurality of pages in common is detected in addition to an individual password uniquely issued for each page;
requesting entry of a shared password if it is judged in the password judging step that a shared password is detected, and requesting entry of an individual password about each of the pages if it is judged in the password judging step that a shared password is not detected; and
permitting the image data of all the pages each having a shared password, which is the image data inputted in the inputting step, if the appropriate shared password is entered in response to the request for entry of a shared password, and permitting image data of a page having an individual password, if the appropriate individual password is entered about that page in response to the request for entry of an individual password.

With this recording medium, a computer is made to execute a process to output all the pages, if the appropriate shared password is entered by a user such as a right user.

(16) Another configuration can be applied to this recording medium, wherein the number of pages to be processed at one time is set in advance on a shared password, and the program further makes the computer execute a process to prohibit the image data of all the pages from being outputted, if the number of the pages which image data are inputted in the inputting step is different from that number set in advance.

With this recording medium, a computer is further made to execute a process to prohibit image data of all the pages from being outputted, if the number of pages which image data are inputted is different from that number set in advance on a shared password.

(17) Further, another configuration can be applied to this recording medium, wherein attributes of pages to be processed at one time are set in advance on a shared password, and the program further makes the computer execute a process to prohibit the image data of all the pages from being outputted, if attributes of the pages which image data are inputted in the inputting step include any attribute different from those attributes set in advance.

With this recording medium, a computer is further made to execute a process to prohibit all the pages from being outputted, if attributes of pages which image data are inputted include any attribute different from those attributes set in advance on a shared password.

(18) A recording medium having an image processing program stored therein to make a computer of an image processing apparatus execute:
inputting image data of a plurality of pages of document;
detecting an individual password uniquely issued for each page, which is given to each of the pages;
giving to each sheet to be outputted, a shared password issued for each plurality of pages in common, after detecting the individual password given to each of the pages; and
displaying the shared password.

With this recording medium, a computer is made to execute a process to give a shared password to each sheet to be outputted.

(19) Another configuration can be applied to this recording medium, wherein the program further makes the computer execute a process to request entry of an individual password about each of the pages if the individual password given to each of the pages is detected, and a shared password is generated based on the individual password entered in response to the entry request and also given to each sheet to be outputted, in the password giving step.

With this recording medium, a computer is made to execute a process to give a shared password generated based on an entered individual password to each sheet to be outputted.

(20) Further, another configuration can be applied to this recording medium, wherein if the individual password given to each of the pages is detected in the password detecting step, the program makes the computer execute a process to request entry of a shared password issued for each plurality of pages in common and also give the shard password entered in response to the entry request to each sheet to be outputted.

With this recording medium, a computer is made to execute a process to give an entered shared password to each sheet to be outputted.

(21) A recording medium having an image processing program stored therein to make a computer of an image processing apparatus execute:

accepting entry of a shared password;

generating an individual password uniquely issued for each page based on the entered shared password, and the number of individual passwords generated herein is the same as the number of image data to be outputted;

displaying the generated individual password; and giving the generated individual password and the shared password to each of the image data to be outputted.

With this recording medium, a computer is made to execute a process to give an individual password and a shared password to each image data to be outputted.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus, comprising:
    an input portion that inputs image data for a plurality of pages of document;
    a password detector that detects one or more than one password embedded into each of the plurality of pages;
    a shared password judger that judges in response to a detecting result from the password detector with respect to each of the plurality of pages, whether or not a shared password embedded into each of the plurality of pages is detected, wherein the shared password is in common among each of the pages in which the shared password is detected;
    an individual password judger that judges in response to the detecting result from the password detector whether or not an individual password embedded into each of the plurality of pages is detected, wherein the embedded individual password for each of the plurality of pages is different;
    a first entry requester that requests entry of the shared password in response to the shared password judger judging that the shared password is detected;
    a second entry requester that requests entry of the individual password for each of the plurality of pages in response to the individual password detector judging that the individual password is detected for the page in response to the shared password not being detected; and
    an output permitting portion that permits an output of image data of all the plurality of pages each having the shared password in common, in response to the appropriate shared password being entered in response to the request for entry of the shared password, and permits an output of image data of the page having the individual password in response to the appropriate individual password being entered for the page in response to the request for entry of the individual password.

2. The image processing apparatus as recited in claim 1, wherein the number of pages to be processed at one time is set in advance on a shared password, and the output permitting portion prohibits the image data of all the plurality of pages from being outputted, if the number of the pages which image data are inputted by the input portion, is different from that number set in advance.

3. The image processing apparatus as recited in claim 1, wherein attributes of pages to be processed at one time are set in advance on a shared password, and the output permitting portion prohibits the image data of all the plurality of pages from being outputted, if attributes of the pages which image data are inputted by the input portion include any attribute different from those attributes set in advance.

4. An image processing apparatus, comprising:
    an input portion that inputs image data of a plurality of pages of a document to generate a plurality of image data objects;
    a password detector that detects an individual password embedded into each page, which is given to each of the plurality of pages, each image data object having the individual password issued to the corresponding page, wherein each image data object and corresponding page has a different individual password from other image data objects and corresponding pages;
    a password giving portion that embeds into each image data object to be outputted, a shared password issued for each image data object, in addition to the individual password detected by the password detector, wherein the shared password is in common among each of the image data objects to be outputted;

wherein the password giving portion embeds the shared password into each image data object by first removing the individual password from each image data object to be outputted and then embedding into each image data object to be outputted both the shared password and the individual password; and a display that displays the shared password.

5. The image processing apparatus as recited in claim 4, further comprising:

an entry requester that requests entry of the individual password for each of the plurality of pages, if the password detector detects the individual password given to each of the plurality of pages, and wherein:

the password giving portion generates the shared password based on the individual password entered in response to the entry request, and embeds the shared password into each of the image data objects to be outputted.

6. The image processing apparatus as recited in claim 4, further comprising:

an entry requester that requests entry of the shared password to be commonly issued for each of the image data objects to be outputted, if the password detector detects the individual password given to each of the plurality of pages, and wherein:

the password giving portion embeds into each image data object to be outputted, the shared password entered in response to the entry request, in addition to the individual password detected by the password detector.

7. An image processing apparatus, comprising:

an accepter that accepts entry of a shared password;

a generator that generates an individual password for each of a plurality of pages based on the entered shared password, and the number of individual passwords generated herein is the same as the number of pages to be outputted, wherein each of the plurality of pages has a different individual password from other pages of the plurality of pages;

a display that displays the generated individual passwords;

a giving portion that embeds one of the generated individual passwords and the shared password into each page to be outputted; and wherein the giving portion embeds one of the generated individual passwords and the shared password into each page to be outputted by first removing the shared password from each page to be outputted and then embedding into each page to be outputted both the shared password and the individual password.

8. An image processing method, comprising:

inputting image data of a plurality of pages of a document;

detecting one or more than one password embedded into each of the plurality of pages;

judging in response to the password detecting result whether or not a shared password embedded into each of the plurality of pages is detected, wherein the shared password is in common among each of the pages in which the shared password is detected;

judging in response to the detecting result whether or not an individual password embedded into each of the plurality of pages is detected, wherein the embedded individual password for each of the plurality of pages is different;

first requesting entry of the shared password in response to the shared password being detected;

second requesting entry of the individual password for each of the plurality of pages in response to the individual password being detected for the page when the shared password is not detected; and permitting image data of all the plurality of pages each having the shared password in common, to be outputted in response to the appropriate shared password being entered in response to the request for entry of a shared password, and permitting image data of the page having an individual password to be outputted in response to the appropriate individual password being entered for the page in response to the request for entry of the individual password.

9. The image processing method as recited in claim 8, wherein the number of pages to be processed at one time is set in advance on a shared password, and the image data of all the plurality of pages are prohibited from being outputted, if the number of the pages which image data are inputted in the inputting step is different from that number set in advance.

10. The image processing method as recited in claim 8, wherein attributes of pages to be processed at one time are set in advance on a shared password, and the image data of all the plurality of pages are prohibited from being outputted, if attributes of the pages which image data are inputted by the input portion include any attribute different from those attributes set in advance.

11. An image processing method, comprising:

inputting image data of a plurality of pages of a document to generate a plurality of image data objects;

detecting an individual password embedded into each page, which is given to each of the plurality of pages, each image data object having the individual password issued to the corresponding page, wherein each image data object and corresponding page has a different individual password from other image data objects and corresponding pages;

embedding into each image data object to be outputted, a shared password issued for each image data object, in addition to the detected individual password, wherein the shared password is in common among each of the image data objects to be outputted;

displaying the shared password; and wherein the shared password is embedded into each image data object by first removing the individual password from each image data object to be outputted and then embedding into each image data object to be outputted both the shared password and the individual password.

12. The image processing method as recited in claim 11, further comprising:

requesting entry of the individual password for each of the plurality of pages if the individual password embedded in each of the pages is detected, and wherein:

the shared password is generated based on the individual password entered in response to the entry request and is also given to each of the image data objects to be outputted, in the password giving step.

13. The image processing method as recited in claim 11, further comprising:

requesting entry of the shared password to be commonly issued for each of the image data objects to be outputted, if the individual password given to each of the plurality of pages is detected in the password detecting step, and wherein:

the shared password is issued for each of the image data objects in response to the entry request.

14. An image processing method, comprising:
accepting entry of a shared password;
generating an individual password for each of a plurality of pages based on the entered shared password, and the number of individual passwords generated herein is the same as the number of pages to be outputted, wherein the individual password for each of the plurality of pages is different;
displaying the generated individual password;
embedding the generated individual password and the shared password into each of the plurality of pages to be outputted; and
wherein the generated individual password and shared password are embedded into each of the plurality of pages to be outputted by first removing the shared password from each of the plurality of pages to be outputted and then embedding into each of the plurality of pages to be outputted both the generated individual password and the shared password.

15. A nontransitory recording medium having an image processing program stored therein to make a computer of an image processing apparatus execute:
inputting image data for a plurality of pages of document;
detecting one or more than one password embedded into each of the plurality of pages;
judging from the password detecting result whether or not a shared password embedded into each of the plurality of pages is detected wherein the shared password is in common among each of the pages in which the shared password is detected;
judging from the detecting result whether or not an individual password embedded into each of the plurality of pages is detected, wherein the embedded individual password for each of the plurality of pages is different;
first requesting entry of the shared password in response to the shared password being detected;
second requesting entry of the individual password for each of the plurality of pages in response to the individual password being detected for the page in response to the shared password not being detected; and
permitting image data of all the plurality of pages each having the shared password in common, to be outputted in response to the appropriate shared password being entered in response to the request for entry of a shared password, and permitting image data of the page having an individual password to be outputted in response to the appropriate individual password being entered for the page in response to the request for entry of the individual password.

16. The recording medium as recited in claim 15, wherein the number of pages to be processed at one time is set in advance on a shared password, and the program further makes the computer execute prohibiting the image data of all the pages from being outputted, if the number of the pages which image data are inputted in the inputting step is different from that number set in advance.

17. The recording medium as recited in claim 15, wherein attributes of pages to be processed at one time are set in advance on the shared password, and the program further makes the computer execute prohibiting the image data of all the pages from being outputted, if attributes of the pages which image data are inputted in the inputting step include any attribute different from those attributes set in advance.

18. A nontransitory recording medium having an image processing program stored therein to make a computer of an image processing apparatus execute:
inputting image data of a plurality of pages of a document to generate a plurality of image data objects;
detecting an individual password embedded into each page, which is given to each of the plurality of pages, each image data object having the individual password issued to the corresponding page, wherein each image data object and corresponding page has a different individual password from other image data objects and corresponding pages;
embedding into each image data object to be outputted, a shared password issued for each image data object, in addition to the individual password detected, wherein the shared password is in common among each of the image data objects to be outputted;
wherein the shared password is embedded into each image data object to be outputted by first removing the individual password from each image data object to be outputted and then embedding into each image data object to be outputted both the shared password and the individual password; and
displaying the shared password.

19. The nontransitory recording medium as recited in claim 18, wherein the program further makes the computer execute requesting entry of an individual password about each of the pages if the individual password embedded into each of the pages is detected, and the shared password is generated based on the individual password entered in response to the entry request and is also embedded into each image data object to be outputted, in the password giving step.

20. The nontransitory recording medium as recited in claim 18, wherein if the individual password given to each of the pages is detected, the program makes the computer execute requesting entry of a shared password issued for each plurality of pages in common and also embedding into each image data object to be outputted the shared password entered in response to the entry request.

21. A nontransitory recording medium having an image processing program stored therein to make a computer of an image processing apparatus execute:
accepting entry of a shared password;
generating an individual password each of a plurality of pages based on the entered shared password, and the number of individual passwords generated herein is the same as the number of pages to be outputted, wherein each of the plurality of pages has a different individual password from other pages of the plurality of pages;
displaying the generated individual password;
embedding one of the generated individual passwords and the shared password into each of the page to be outputted; and
wherein the generated individual password and shared password is embedded into each of the plurality of pages to be outputted by first removing the shared password from each of the plurality of pages to be outputted and then embedding into each of the plurality of pages to be outputted both the generated individual password and the shared password.

* * * * *